Figure 3:
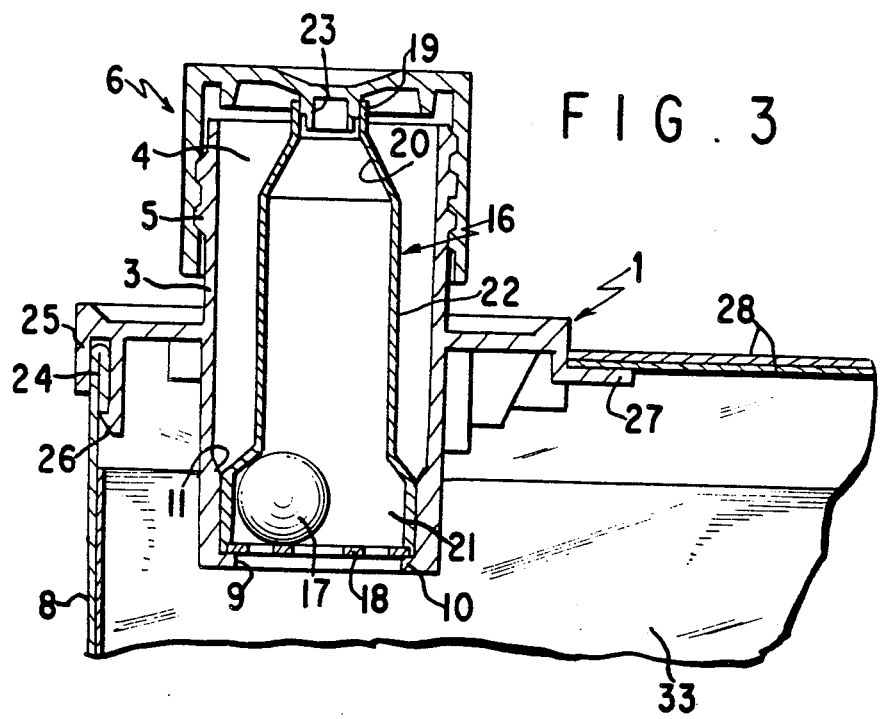

United States Patent [19]
vom Hofe et al.

[11] Patent Number: 4,489,859
[45] Date of Patent: Dec. 25, 1984

[54] CLOSURE FOR A PACKAGING CONTAINER

[75] Inventors: Dieter vom Hofe, Cologne; Peter Vierkötter, Leverkusen, both of Fed. Rep. of Germany

[73] Assignee: Henkel Kommanditgesellschaft auf Aktien, Düsseldorf-Holthausen, Fed. Rep. of Germany

[21] Appl. No.: 437,875

[22] Filed: Oct. 29, 1982

[30] Foreign Application Priority Data

Nov. 14, 1981 [DE] Fed. Rep. of Germany ....... 3145357

[51] Int. Cl.³ .............................................. B65D 47/06
[52] U.S. Cl. .................... 222/183; 222/443; 222/456; 222/500
[58] Field of Search ............... 222/425, 443, 456, 457, 222/500, 183, 454, 455; 220/462, 463

[56] References Cited

U.S. PATENT DOCUMENTS

| 2,425,313 | 8/1947 | Hammerstein | 222/500 |
| 2,943,767 | 7/1960 | Moro-Lin | 222/425 X |
| 3,129,859 | 4/1964 | Chappell | 222/500 X |
| 3,779,429 | 12/1973 | Porcelli | 222/500 |

FOREIGN PATENT DOCUMENTS

| 577207 | 5/1958 | Italy | 222/500 |
| WO80/00556 | 4/1980 | PCT Int'l Appl. | 220/463 |

Primary Examiner—H. Grant Skaggs
Assistant Examiner—Frederick R. Handren
Attorney, Agent, or Firm—Hammond & Littell, Weissenberger & Dippert

[57] ABSTRACT

A closure for a packaging container is provided, the closure permitting the continuous or intermittent dispensing of a liquid or free-flowing product. The closure comprises a continuous pipe sleeve with a bottom opening molded in the product dispensing opening, which pipe sleeve is provided with a tubular ball bearing housing within which a valve ball is free to move, which tubular housing includes a sealing cone which acts as a ball valve seat at the longitudinal sleeve outlet and a flared annular ball chamber above the bottom opening, which forms the longitudinal sleeve inlet end, and a freely movable valve ball located within the continuous tubular ball bearing housing.

10 Claims, 4 Drawing Figures

U.S. Patent   Dec. 25, 1984   Sheet 2 of 2   4,489,859
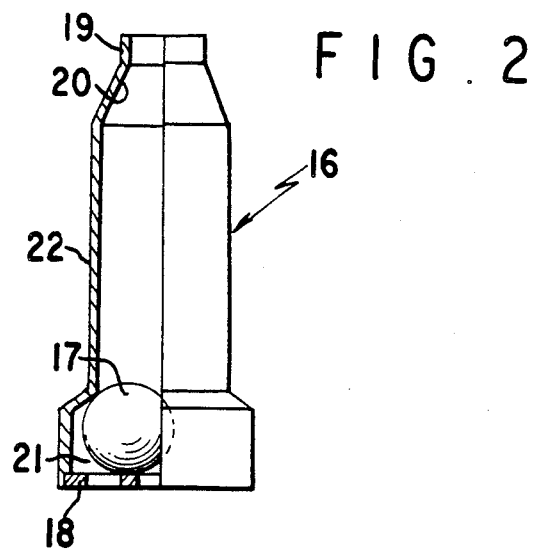
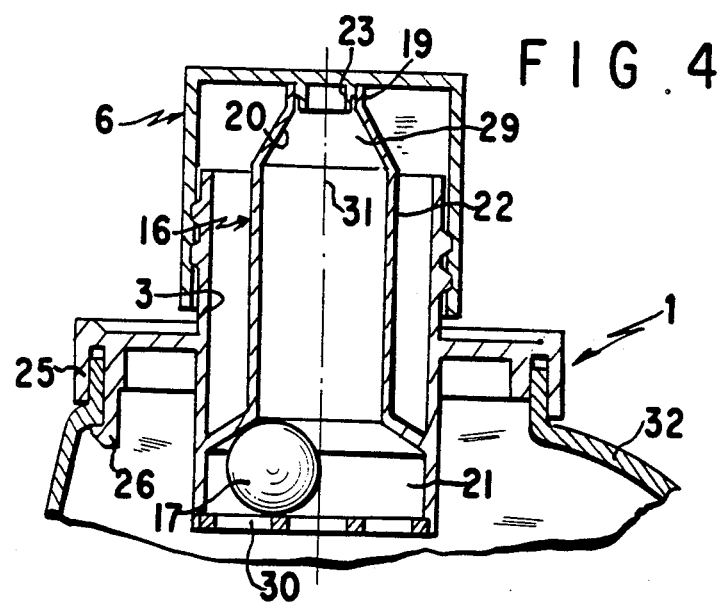

CLOSURE FOR A PACKAGING CONTAINER

BACKGROUND OF THE INVENTION

The invention concerns a closure for a packaging container with a mechanically reinforced case for liquid or a free-flowing product. The case can be in the form of a folding carton, a plastic bottle, a metal or a glass container or a similar form.

A packaging container with a mechanically reinforced case and having a sealing liner inserted in the former, especially a liner that is blown from a preform, for which envelope and liner, which after separate manufacture are connected together with the aid of an adapter top that is adapted to receive their respective openings and enclose a product dispensing opening in the liner, is described in DE-OS 30 45 710.4.

In the prior art combination system of two packaging components the adapter top essentially has a pure connecting function and serves to simplify the assembling. For this purpose, the adapter top is drawn over the preform used for producing the sealing liner before its forming, i.e. inflating, and fixed on the preform in a position secured against twisting circumferentially. By forming the preform, for example by an inflating process, the adapter top is then also secured, either before or after insertion into the case, in the axial direction of the sealing liner produced from the preform. To produce the solid, permanent connection between liner and adapter top, the latter must be attached first to the preform and the preform must be inflated through the adapter top, especially with the aid of a separate arbor or heated blowing mandrel. The adapter tops shown in the prior art patent specification thus consist essentially of a circular area surrounding the product dispensing opening and the coupling parts needed to connect the sealing liner and case.

A metering device with a ball valve that can be disposed within a vessel containing a liquid can have a ball valve that closes the product dispensing opening of the container when the latter is in a certain tilted position is described in DE-OS 30 26 067.4. The opening in this measuring device is formed as a lateral slit-shaped opening of the ball valve tubular housing extending in the axial direction to the adapter top opening. Dispensing a product from prior closing devices results from pressing on a suitably flexible container which releases measured squirts.

OBJECT OF THE INVENTION

An object of the invention is to provide a closure for a packaging container which holds liquids or a free-flowing product.

Another object of the invention is to provide a closure for a packaging container for liquids or a free-flowing solids which is reclosable.

A further object of the invention is to provide a closure for a packaging container which includes a controllable valve for interrupting dispensing of the contents of said container.

Another object of the invention is to provide a closure for a packaging container which includes means for dispensing some of its contents and reclosing the container without the contents touching the user.

Another object of the invention is to provide a closure for a packaging container for liquid or free-flowing product with a mechanically reinforced case, wherein a continuous pipe sleeve with a bottom opening is molded into the product dispensing opening of a top adapted to fit and reinforce the case and fixedly attached to a liner at the top's longitudinal end, which faces into the interior of the container, and that a pipe piece which includes a sealing cone which acts as a ball valve seat at the longitudinal sleeve outlet end and a flared annular ball chamber above the bottom opening, and with a freely moveable valve ball in it is located within the continuous sleeve.

These and other objects of the invention will become more apparent as the description thereof proceeds.

DRAWINGS

Figure 1:
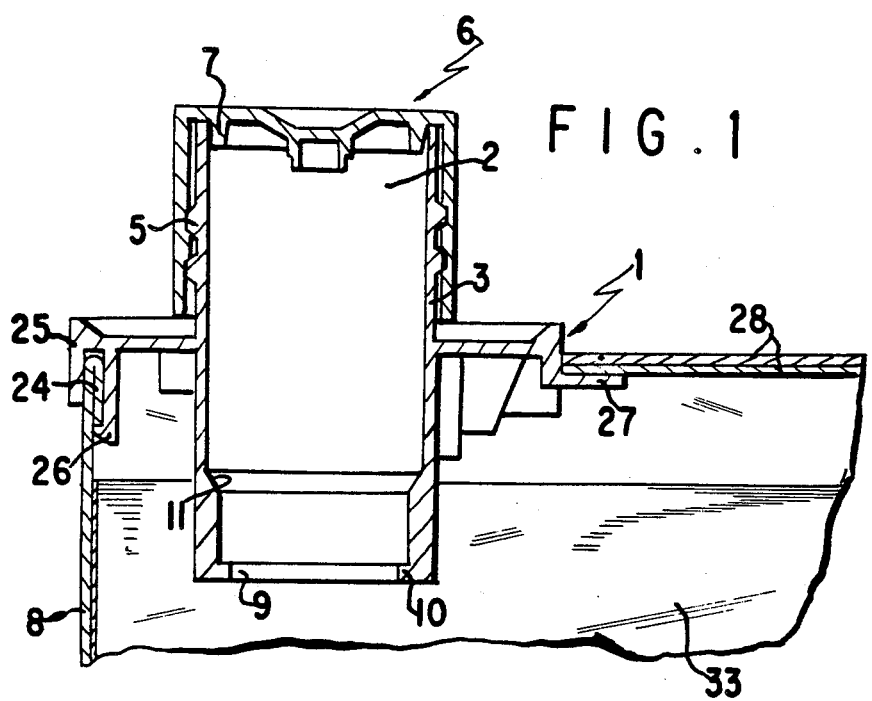

FIG. 1 closure adapted to receive a tubular ball bearing housing which acts as a valve.

FIG. 2 section through a tubular ball bearing housing valve suitable for combination with the closure of FIG. 1.

FIG. 3 is a section through the combination of the closure of FIG. 1 with the tubular ball bearing housing valve.

FIG. 4 section through an adapter top and tubular ball bearing housing valve molded in one unit.

DESCRIPTION OF THE INVENTION

The present invention is based on the task of creating a closure for a packaging container of the type initially mentioned, having a metering device with a ball valve which ball valve closes the product dispensing opening of the container when the container is tilted. The packaging container is also reclosable and is provided with a tight closure to protect hygroscopic powder products from moisture. The container may be equipped with a child-proof cap. The solution, according to the present invention, consists of shaping a generally short, tubular ball bearing housing with bottom-openings at the end facing the container's interior connected to the product dispensing opening of an adapter top fitted to the container case and in some cases to a sealing liner. The short tubular ball bearing housing is provided with a sealing cone which, in cooperation with the valve ball, seals the product dispensing opening at the outer end of the ball bearing race housing while the inner end of the tube is flared forming a valve ball retaining annular chamber which releases the ball which seals the product dispensing opening when a certain angle of tilt is exceeded and the ball seats on the sealing cone.

In one example, the short tubular ball bearing housing shall have at its inner end, or bottom, facing the container's interior a bottom opening with a flange that encircles the interior surface in sections or completely. Under this condition, for example, a piece of pipe, which has a sealing cone with ball valve to form a seal at the product dispensing end at the outlet side of the container closure and a flared annular ball chamber at the inner end. The intake side of the closure to be turned toward the bottom opening of the socket is in the form of a short tubular ball bearing housing, with a valve ball free to move in it, which can be provided or inserted in the continuous pipe sleeve as a separate building element until it rests against the inwardly projecting flange.

The metering device is inserted into the pipe sleeve of the adapter top especially after filling the container with the respective liquid or free-flowing product. Thus the opening through the adapter top remains unobstructed during the entire manufacturing process for a possible use of take-up or blowing mandrel. The part of the flared annular ball chamber to be turned toward the bottom opening of the pipe sleeve shall be fitted with a screen or made in the form of a perforated disk to prevent the loss of the valve ball from the ball bearing housing during the operation of the metering device. When the outlet end of the ball bearing housing to be inserted into the pipe sleeve which lies opposite the flared annular ball chamber is provided with a sealing cone, the advantageous capability of closing the product dispensing opening at the cone results.

A closing cap for the product dispensing outlet may may have on its inner surface facing the outlet opening a sealing flange that is fitted into the outlet opening or over it. The attaching of such a closing cap closes the product dispensing opening by the simultaneous action of the sealing flange as well as by the securing of the cap. If desired, the closure means of the cap may be provided with a child-proof capability.

Significant changes in the manufacturing process do not result, even when the previously mentioned tubular ball bearing housing is produced in one unit with the sleeve at the neck, i.e. when a piece of pipe which forms a cone and ends in the product dispensing opening is attached to or molded as part of, the inner wall of the sleeve.

A part of the pipe sleeve may project from inside the container through the adapter top and may be used or shaped as a heat-seal connection for heat-sealing on a sealing liner, preferably of plastic, in the packaging container according to the invention. A tight coupling of adapter top and liner so that it cannot be twisted can be produced with this heat-sealed joint, without any special preparation by suitable shaping of the contact areas in question.

FIG. 1 shows an adapter part 1 provided to a container 8. The adapter top 1 mechanically strengthened and reinforces the sides of container 8. Depending on the configuration of the adapter top 1 and container 8 they may be attached to each other in several ways. The folded upper edge 24 of container 8 may be held immoveably against the peripheral rim 25 of the adapter top 1 by locking dog 26. A part or all of one edge of adapter top 1 may be formed into a side flap 27 which may be glued to and serve as a support of an edge of the container top 28. A sealing liner 33 disposed within container 8 may be fixably attached to adapter top 1 and the product contained therein dispensed through product dispenser opening 2 in pipe sleeve 3.

FIG. 1 also shows an adapter top which includes as a part thereof a molded continuous pipe sleeve 3 which provides a product dispensing opening 2 from container 8. Pipe sleeve 3 may be any desired cross section, but the cyclindrical form is prefered. A closing cap 6 may be fastened with a child-proof device or a simple screw thread 5. Placed over the outlet side 4 of the continuous pipe sleeve 3 closing cap 6 may have a circular clamping flange 7 on the inside for sealing pipe sleeve 3.

In the embodiment shown in FIG. 1, the pipe sleeve 3 has in its bottom, opening 9 with flange 10, which encircles its interior partially or completely. The area on the inside of pipe sleeve 3 adjacent to bottom opening may taper from the outlet side via bevel 11 to a slightly smaller diameter which continues to the lower end of pipe sleeve 3 to flange 10.

The embodiment shown in FIG. 1, may be used for dispensing the contents of container 8 as it is shown or is designed in such a way that it will accept the metering apparatus shown in FIG. 2 which is designed to be friction fitted into the narrow portion of pipe sleeve 3 which apparatus may be sealed at its outlet end by means of sealing cap flange 23.

FIG. 2 shows a metering apparatus which comprises a tubular ball bearing housing 16 which is provided with a valve ball 17 and a perforated disk 18 at the container side closer to the inlet end. For this purpose the outside diameter of the prefabricated bearing housing 16 is adapted to fit snugly the inside diameter of the bottom end of pipe sleeve 3 and to rest against flange 10 in such a manner that a tight fit is obtained when bearing housing 16 is fitted into sleeve 3.

FIG. 3 shows a cross sectional view of the ball bearing housing 16-valve for use with container 8, said container being provided with an appropriately designed adapter top 1 which comprises a continuous pipe sleeve 3 which receives said ball bearing housing 16-valve and a closing cap 6 which has provided on its inner surface a sealing flange 23 which mates with the passage in neck 19, thereby sealing the means for dispensing a product from the complete package.

FIG. 2 shows a ball bearing housing 16 which consists of a piece of pipe 22 which has a neck 19 and a tapered, leak proof sealing cone 20 and at the outlet end a flared annular ball chamber 21. At the opposite end which is designed to be fitted into the narrowed intake end of pipe sleeve 3 and be retained there by flange 10.

Flange 10 having bottom opening 9 prevents ball bearing housing 16 from being pushed through into container 8, but permits passage of the container contents into the valve chamber. The floor of the annular ball chamber 21 is a perforated disk 18 which when the ball bearing housing 16 is in place abutting flange 10 of pipe sleeve 3, permits flow of the contents of container 8 through said ball bearing housing 16 to be dispensed through the outlet necked down sealing cone 16.

FIG. 3 shows the assembled adapter top 1 and ball bearing housing 16 in which the adapter top 1 is fixed attached to container 8, said adapter top 1 having been molded as part of it said continuous pipe sleeve 3 and so shaped as to receive in a tight fit, the ball bearing housing 16, valve which has its dispensing outlet through neck 19 sealed by sealing flange 23 of closing cap 6, when it is screwed down. Another feature of cap 6 is clamping flange 7 which in cooporation with the upper edge of pipe sleeve 3 seals the outlet end of it or just the space between the ball bearing housing 16 and the inside of pipe sleeve 3.

Another example of the invention is shown in cross section in FIG. 4. This closure is distinguished from that according to FIGS. 1 and 3 mainly by its single-unit ball bearing housing 16 consisting of pipe section 22, neck 19, sealing cone 20, and flared, annular ball chamber 21 which is part of pipe sleeve 3 of adapter top 1. In this case, the product dispensing opening neck 19 and sealing cone 20 and an opening 30 in the bottom of flared, annular ball chamber 21 can be aligned along a center line 31 of pipe piece 16. Otherwise, the fastening elements of adapter top 1 of FIG. 3 are the same as those of FIG. 1. Adapter top 1 can also be attached to a plastic bottle, a metal or a glass container.

The pipe sleeve 3 according to the invention is preferably a form suitable for tight connection with or heat sealing onto an opening of a sealing liner 33 provided in the interior of container 8 (cf. FIG. 1). A combination package consisting of outer, supporting case 32, especially one made of cardboard, and an inner, liquidimpermeable liner 33, which may be made of foil tubing, can be produced by this method. In this case, the adapter top is heat sealed into the opening of the liner to produce a tight seal and at the same time forms the connecting element for the case 32 and thereby the present packaging container. The completely assembled package is filled through the adapter mouth, i.e. through the opening in the adapter top.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A closure for a packaging container for liquid or free-flowing product with a mechanically reinforced case, said closure permitting the continuous or intermittent dispensing of the said liquid or free-flowing product contents of said packaging container, wherein a continuous pipe sleeve with a bottom opening is molded into the product dispensing opening of a top adapted to fit and reinforce the case and fixedly attach to a liner at the top's longitudinal end, which faces into the interior of the container, said continuous pipe sleeve being provided with a tubular ball bearing housing within which a valve ball is free to move, which includes a sealing cone which acts as a ball valve seat at the longitudinal sleeve outlet end and a flared annular ball chamber, above the bottom opening, which forms the longitudinal sleeve inlet end, and a freely movable valve ball located within the continuous tubular ball bearing housing.

2. A closure as set forth in claim 1, wherein the inner surface of the bottom opening of the pipe sleeve is provided with a partially or completely encircling flange and the tubular ball bearing housing which is to be located in the pipe sleeve is a separate insertable element suitably sized to fit into the pipe sleeve until it rests against the bottom flange.

3. A closure according to claim 1, wherein the outlet end of the pipe sleeve is provided with a closing cap, said closing cap having on its inner surface facing a product dispensing opening a sealing flange which seals the product dispensing opening of the tubular ball bearing housing.

4. A closure according to claim 2, wherein the outlet end of the pipe sleeve is provided with a closing cap, said closing cap having on its inner surface facing a product dispensing opening a sealing flange which seals the product dispensing opening of the tubular ball bearing housing.

5. A closure as set forth in claim 2 wherein the surface of the flared annular ball chamber which is to face the bottom opening of the continuous pipe sleeve is a perforated disk.

6. A closure as set forth in claim 3 wherein the surface of the flared annular ball chamber which is to face the bottom opening of the continuous pipe sleeve is a perforated disk.

7. A closure as set forth in claim 3, wherein the tubular ball bearing housing contains a sealing flange on the closure outlet side which is molded as an extension of the inside wall of the pipe sleeve.

8. A closure as set forth in claim 1, wherein the tubular ball bearing housing contains a sealing flange on the closure outlet side which is molded as an extension of the inside wall of the pipe sleeve.

9. A closure as set forth in claim 5, wherein the sealing cone of the ball bearing housing becomes operative when the closure is tilted sufficiently.

10. A closure as set forth in claim 1 wherein the pipe sleeve is heat sealed together with a sealing liner of the container.

* * * * *